(12) United States Patent
Fukuda

(10) Patent No.: US 7,649,552 B2
(45) Date of Patent: Jan. 19, 2010

(54) VIDEO SIGNAL PROCESSING APPARATUS

(75) Inventor: Hiroshi Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 611 days.

(21) Appl. No.: 11/187,796

(22) Filed: Jul. 25, 2005

(65) Prior Publication Data

US 2006/0023084 A1 Feb. 2, 2006

(30) Foreign Application Priority Data

Jul. 27, 2004 (JP) .......................... P2004-218619

(51) Int. Cl.
- H04N 5/225 (2006.01)
- H04N 5/222 (2006.01)
- H04N 7/01 (2006.01)
- H04N 5/46 (2006.01)
- H04N 9/79 (2006.01)
- H04N 7/26 (2006.01)
- H04N 5/00 (2006.01)

(52) U.S. Cl. .............. 348/220.1; 348/333.11; 348/333.12; 348/445; 348/556; 386/40; 386/112; 386/120

(58) Field of Classification Search .............. 348/220.1, 348/231.99, 333.11, 333.12, 222.1, 333.01, 348/333.02, 445, 448, 555, 556; 386/40, 386/37, 95, 111, 112, 131, 120

See application file for complete search history.

(56) References Cited

U.S. PATENT DOCUMENTS

| | | | | |
|---|---|---|---|---|
| 5,485,280 A * | 1/1996 | Fujinami et al. | ............ | 386/123 |
| 5,510,902 A * | 4/1996 | Fujinami et al. | ............ | 386/123 |
| 5,594,552 A * | 1/1997 | Fujinami et al. | ............ | 386/131 |
| 5,835,671 A * | 11/1998 | Kitamura et al. | .............. | 386/97 |
| 5,999,220 A * | 12/1999 | Washino | ...................... | 348/441 |
| 6,144,414 A * | 11/2000 | Toba | ........................... | 348/564 |
| 6,370,198 B1 * | 4/2002 | Washino | ................ | 375/240.26 |
| 6,466,264 B1 * | 10/2002 | Shioji | ....................... | 348/231.4 |
| 6,535,688 B1 * | 3/2003 | Kawamura et al. | ............ | 386/95 |
| 6,785,463 B2 * | 8/2004 | Yamauchi et al. | ............. | 386/46 |
| 6,829,429 B1 * | 12/2004 | Kitahashi et al. | .............. | 386/95 |
| 7,233,735 B2 * | 6/2007 | Kikuchi et al. | .............. | 386/125 |
| 7,292,273 B2 * | 11/2007 | Shioji | .................... | 348/231.99 |
| 7,525,589 B2 * | 4/2009 | Sasagawa | .............. | 348/333.12 |
| 2003/0011689 A1 | 1/2003 | Shioji | | |

(Continued)

FOREIGN PATENT DOCUMENTS

EP  0 595 323 A2  5/1994

(Continued)

Primary Examiner—Tuan Ho
Assistant Examiner—Marly Camargo
(74) Attorney, Agent, or Firm—Finnegan, Henderson, Farabow, Garrett & Dunner, L.L.P.

(57) ABSTRACT

A video signal processing apparatus able to obtain a suitable still image from a squeezed video signal, including a converting unit configured to judge whether or not a video signal has been squeezed based on an input video signal and aspect information indicating the aspect ratio of the video signal and to inverse-squeeze it to the designated video signal when judging that it was squeezed as a result of the judgment to convert it to a video signal of a still image of a prescribed image size and a still image recording and/or reproduction unit configured to record the video signal of the still image converted by the converting unit.

10 Claims, 4 Drawing Sheets

U.S. PATENT DOCUMENTS

| | | | |
|---|---|---|---|
| 2004/0100584 A1* | 5/2004 | Takagi et al. | 348/556 |
| 2006/0038898 A1* | 2/2006 | Fukuda | 348/231.99 |
| 2006/0092324 A1* | 5/2006 | Morishige | 348/556 |
| 2008/0030614 A1* | 2/2008 | Schwab et al. | 348/441 |

FOREIGN PATENT DOCUMENTS

| | | |
|---|---|---|
| EP | 1 030 518 A2 | 8/2000 |
| JP | 05-284452 | 10/1993 |
| JP | 09-070014 | 3/1997 |
| JP | 2000-041214 | 2/2000 |
| JP | 03-158649 | 4/2001 |

\* cited by examiner

VIDEO SIGNAL PROCESSING APPARATUS

CROSS REFERENCES TO RELATED APPLICATION

The present invention contains subject matter related to Japanese Patent Application No. 2004-218619 filed in the Japan Patent Office on Jul. 27, 2004, the entire content of which being incorporated herein by reference.

BACKGROUND OF THE INVENTION

1. Field of Invention

The present invention relates to a video signal processing apparatus for processing video signals having for example a plurality of different aspect ratios.

2. Description of the Related Art

There is known a video signal recording and/or reproduction apparatus such as a video tape recorder for recording and reproducing a video signal obtained by capturing (taking) an image of a subject to and from a magnetic tape or other recording medium (refer to for example Japanese Patent No. 3,158,649).

Also, there is known an apparatus having a plurality of image capturing modes for obtaining images of different aspect ratios, for example, the 4:3 and 16:9 aspect ratios.

General apparatuses record a moving picture captured in an image capturing mode having for example an aspect ratio of 4:3 on a magnetic tape or other recording medium in the form of a video signal of an image size of the aspect ratio of 4:3 as it is and record a moving picture captured in an image capturing mode having an aspect ratio of 16:9 on a recording medium in the form of a video signal having the same image size as that explained above by compressing it in a horizontal direction, that is, "squeezing" it.

However, if reproducing a squeezed moving picture and recording a still image of a desired timing on a recording medium, the above apparatus records the still image as squeezed, that is, a vertically long still image compressed in the horizontal direction, on the recording medium. For this reason, an apparatus improving on the above-explained point has been demanded.

SUMMARY OF THE INVENTION

It is desirable to provide a video signal processing apparatus able to obtain a suitable still image from a squeezed video signal.

According to the present invention, there is provided a video signal processing apparatus having; a converting unit configured to judge whether or not a video signal has been squeezed based on an input video signal and aspect information indicating an aspect ratio of the video signal and to inverse-squeeze the designated video signal when judging that it was squeezed as a result of the judgment to convert the signal to a video signal of a still image having a prescribed image size; and a recording means for recording the video signal of the still image converted by the converting means.

According to the video signal processing apparatus of the present invention, therefore, the converting unit judges whether or not the video signal was squeezed based on the input video signal and aspect information indicating the aspect ratio of the video signal and inverse-squeezes the designated video signal when judging that it was squeezed as a result of the judgment to convert the signal to a video signal of a still image having a prescribed image size. The recording unit records the video signal of the still image converted by the converting unit.

According to the present invention, there is also provided a video signal processing apparatus having; a first recording and/or reproducing unit configured to record video signals having first and second aspect ratios as video signals of moving pictures having prescribed image sizes linked with aspect information indicating the aspect ratios and to reproduce the recorded video signals and aspect information, a second recording and/or reproducing unit configured to record video signals of still images having image sizes in accordance with the first and second aspect ratios linked with image size information indicating the image sizes and reproduce the recorded video signals and image size information; and a converting unit configured to convert video signals of moving pictures reproduced by the first recording and/or reproducing unit to video signals of still images having image sizes in accordance with the aspect information of the video signals and outputting the same to the second recording and/or reproducing unit.

According to the video signal processing apparatus of the present invention, the converting means converts the video signals of moving pictures reproduced by the first recording and/or reproducing unit to video signals of still images having image sizes in accordance with the aspect information of the video signals and outputs the same to the second recording and/or reproducing unit. The second recording and/or reproducing unit records and reproduces the video signals of the still images from the converting unit.

According to the present invention, there is provided a video signal processing method including: a converting step of judging whether or not a video signal has been squeezed based on an input video signal and aspect information indicating an aspect ratio of the video signal and inverse-squeezing the designated video signal when judging that it was squeezed as a result of the judgment to convert the signal to a video signal of a still image having a prescribed image size; and a recording step of recording the video signal of the still image converted in the converting step.

According to the present invention, there is also provided a video signal processing method able to process a video signal of a first aspect ratio and a video signal of a second aspect ratio, including: a first recording and/or reproducing step of recording video signals as video signals of moving pictures having prescribed image sizes linked with aspect information indicating the first and second aspect ratios and reproducing the recorded video signals and the aspect information; a converting step of converting video signals of moving pictures reproduced in the first recording and/or reproducing step to video signals of still images having image sizes in accordance with the aspect information of the video signals; and a second recording and/or reproducing step of recording video signals of still images converted at said converting step linked with image size information indicating the image sizes and reproducing the recorded video signals and image size information.

According to the present invention, a video signal processing apparatus able to obtain a suitable still image from a squeezed video signal can be provided.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
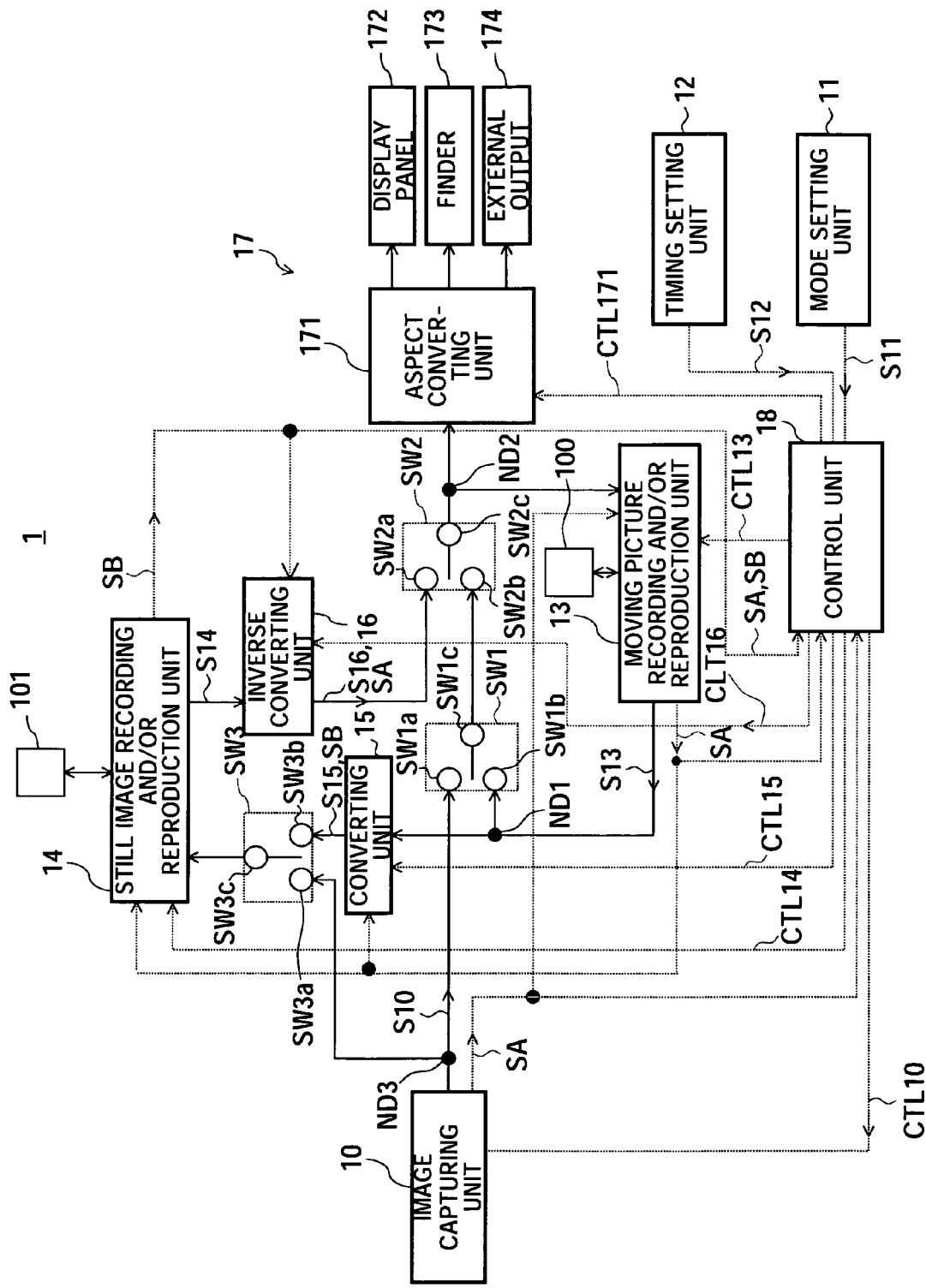
FIG. 1 is a functional block diagram of a video recorder using a video signal processing apparatus according to a first embodiment of the present invention.

Preferred embodiments of the present invention will be described in detail below while referring to the attached figures.

First Embodiment

First, an explanation will be given of a built-in camera type video recorder (also simply referred to as a "video recorder") using a video signal processing apparatus according to a first embodiment of the present invention.

The video recorder according to the present embodiment has a moving picture recording and/or reproduction unit configured to record and reproduce video having any aspect ratio between 4:3 and 16:9 together with an aspect information to and from a recording medium as a moving picture having the same image size, a still image recording and/or reproduction unit configured to record and reproduce still images having image sizes corresponding to the aspect ratios of 4:3 and 16:9 together with the image size information to and from the recording medium, and a converting unit configured to judge whether or not the signal has been squeezed based on the aspect information indicating the aspect ratio when converting a reproduced moving picture from the moving picture recording and/or reproduction unit to a still image and recording the same and to inverse-squeeze (unsqueeze) the signal when judging that the signal was squeezed, as a result of the judgment, to convert the same to a video signal of a still image having the prescribed image size.

Below, a detailed explanation will be given by referring to the drawings.

FIG. 1 is a functional block diagram of a video recorder using a video signal processing apparatus according to a first embodiment of the present invention. A video recorder 1 according to the present embodiment has, for example as shown in FIG. 1, an image capturing (taking or obtaining) unit 10, mode setting unit 11, timing setting unit 12, moving picture recording and/or reproduction unit 13, still image recording and/or reproduction unit 14, converting unit 15, inverse-converting unit 16, output system 17, control unit 18, and selectors SW1 to SW3.

The converting unit 15 and the control unit 18 correspond to an example of the converting means according to the claims of the present invention. The inverse-converting unit 16 corresponds to an example of the inverse-converting means according to the claims the present invention. The moving picture recording and/or reproduction unit 13 corresponds to examples of the first recording and/or reproducing means and the recording and/or reproducing means according to the claims of the present invention. The still image recording and/or reproduction unit 14 corresponds to examples of the second recording and/or reproducing means and the recording means according to the claims of the present invention. The image capturing unit 10 corresponds to an example of the image capturing means according to the claims of the present invention. The output system 17 corresponds to an example of the displaying means according to the claims of the present invention.

The image capturing unit 10 is able to switch the aspect and able to output a video signal of for example a normal aspect ratio of 4:3 and a wide aspect ratio of 16:9. For example, the image capturing unit 10 outputs a video signal having the designated aspect ratio among a plurality of aspect ratios and aspect information indicating the aspect ratio under the control of the control unit 18. In more detail, the image capturing unit 10 outputs a video signal S10 to the selector SW1 and outputs the aspect information SA indicating the aspect ratio to the moving picture recording and/or reproduction unit 13 and the control unit 18 etc.

The image capturing unit 10 is configured by an analog/digital (A/D) conversion circuit for converting an analog image signal output from a charge coupled device (CCD), complementary metal oxide semiconductor (CMOS) device, or other image capturing device, to a digital format, a processing circuit for applying gamma correction processing and automatic gain control (AGC) processing, and so on.

The mode setting unit 11 is operated when setting a plurality of modes, for example, an image capturing mode for obtaining a video signal having an aspect ratio of the range where the moving picture or still image was captured, i.e., in the present embodiment, an aspect ratio of for example 4:3 or 16:9, when setting a moving picture capturing mode and a still image capturing mode, and when setting an edit mode for recording for example a still image of a designated timing in a reproduced moving picture, and outputs a signal S11 in response to the operation to the control unit 18.

The control unit 18, when receiving the signal S11, performs processing in accordance with the mode of the signal S11. For example, the control unit 18 outputs a control signal CTL10 for setting the aspect ratio to that in accordance with the mode of the signal S11 to the image capturing unit 10. The image capturing unit 10, when receiving the control signal CTL10, generates a video signal of an image having an aspect ratio in accordance with the control signal CTL10. The mode setting unit 11 is configured by an operation input device such as operation buttons or a touch panel on a display, for example.

The timing setting unit 12 is operated when for example designating a still image of the desired timing in a video signal of the moving picture reproduced by the moving picture recording and/or reproduction unit 13 and outputs a signal S12 in accordance with the operation to the control unit 18. Further, the timing setting unit 12 is operated when starting and suspending recording at the time of for example the moving picture capturing mode, is operated at a desired shutter timing at the time of the still image capturing mode, and outputs the signal S12 in accordance with the operation to the control unit 18. The control unit 18 receives the signal S12 output from the timing setting unit 12 and performs processing in response to the signal S12.

The selectors SW1 to SW3 switch the components to become connected or not connected under the control of the control unit 18. For example, the selector SW11 has terminals SW1*a* to SW1*c*, the selector SW2 has terminals SW2*a* to SW2*c*, and the selector SW3 has terminals SW3*a* to SW3*c*.

The terminal SW1*a* is connected to the image capturing unit 10, the terminal SW1*b* is connected to the converting unit 15 and the moving picture recording and/or reproduction unit 13 via a node ND1, and the terminal SW1*c* is connected to the terminal SW2*b*. The terminal SW2*a* is connected to the inverse-converting unit 16, the terminal SW2*b* is connected to the terminal SW1c, and the terminal SW2c is connected to the moving picture recording and/or reproduction unit 13 and the aspect converting unit 171 of the output system 17 via a node ND2. The terminal SW3a is connected to the image capturing unit 10 and the terminal SW1a via a node ND3, the terminal SW3b is connected to the converting unit 15, and the terminal SW3c is connected to the still image recording and/or reproduction unit 14.

The moving picture recording and/or reproduction unit 13 records video signals having the first and second aspect ratios linked with the aspect information indicating the aspect ratios as video signals of moving pictures of the prescribed image sizes under the control of for example the control unit 18 and reproduces the recorded video signals and aspect information.

The moving picture recording and/or reproduction unit 13 squeezes or does not squeeze (unsqueezes) the video signals in accordance with the aspect information SA of the input video signals based on for example the control signal CTL13 from the control unit 18, records the same on a recording medium 100 linked with the aspect information, and reproduces and outputs the video signals and aspect information SA recorded on the recording medium 100.

More specifically, the moving picture recording and/or reproduction unit 13 stores a video signal with the image size of the 4:3 aspect ratio when the aspect ratio of the video signal of the moving picture output from the image capturing unit 10 is 4:3 and the recording format of the moving picture is SD (standard image). Further, the moving picture recording and/or reproduction unit 13 compresses the image along a prescribed direction, specifically along a lateral direction (horizontal direction), when the aspect ratio of the video signal of the moving picture output from the image capturing unit 10 is 16:9 and records a video, signal of the moving picture having an image size of 4:3 (also referred to as squeezed or full mode recording) on the recording medium 100. As explained above, by squeezing and recording an image having a wide aspect ratio of 16:9, it is possible to expand the image in the horizontal direction for display when displaying the same on a display device having a display screen of for example 16:9 and thereby obtain a higher quality displayed image in comparison with a case for example of expanding an image of 4:3 in the horizontal direction for display.

The moving picture recording and/or reproduction unit 13 records a video signal of a moving picture on the recording medium 100 and reproduces the video signal recorded on the recording medium 100 by the prescribed recording and/or reproduction scheme, for example, the NTSC (National Television Standards Committee), DV (Digital Video), MPEG (Moving Picture Experts Group), or other recording and/or reproduction scheme.

The recording medium 100 is for example a magnetic tape, DVD (Digital Versatile Disk), magneto-optic disk, rewritable CD (Compact Disk), magnetic hard disk, memory card, or other recording medium. This recording medium 100 can be attached to or detached from the video recorder 1 and along with this can be electrically connected and disconnected to and from the moving picture recording and/or reproduction unit 13 of the video recorder 1.

Further, the video signal recorded on the recording medium 100 can be reproduced by another video signal processing apparatus or a personal computer etc. having reproduction and recording functions of the same standard as that of the above-explained recording and/or reproduction scheme. Further, the moving picture recording and/or reproduction unit 13 can also reproduce a video signal recorded on the recording medium 100 by the above-explained recording and/or reproduction scheme by another video signal recording apparatus.

The still image recording and/or reproduction unit 14 records video signals of still images of image sizes in accordance with the first and second aspect ratios on a recording medium 101 linked with image size information indicating the image size under the control of for example the control unit 18 and reproduces the video signals and image size information recorded on the recording medium 101.

The still image recording and/or reproduction unit 14 records video signals of still images on the recording medium 101 and reproduces the recorded video signals by a prescribed recording and/or reproduction scheme such as the JPEG (Joint Photographic Experts Group), GIF (Graphic Interchange Format), PNG (Portable Network Graphics), or other recording and/or reproduction scheme.

The recording medium 101 is for example a magnetic tape, DVD (Digital Versatile Disk), magneto-optic disk, rewritable CD (Compact Disk), magnetic hard disk, memory card, or other recording medium. This recording medium 101 can be attached to or detached from the video recorder 1 and along with this can be electrically connected or disconnected to and from the moving picture recording and/or reproduction unit 13 of the video recorder 1. A video signal recorded on the recording medium 101 can be reproduced by another video signal processing apparatus or a personal computer etc. having a reproduction and recording function of the same standard as that of the above-explained recording and/or reproduction scheme. Further, the still image recording and/or reproduction unit 14 can also reproduce a video signal recorded on a recording medium 101 by the above-explained recording and/or reproduction scheme by another video recording apparatus.

For example, the still image recording and/or reproduction unit 14 records a video signal of a still image converted by the converting unit 15 in response to the control signal CTL14 from the control unit 18.

The converting unit 15 judges whether or not the video signal was squeezed based on the input video signal and the aspect information SA indicating the aspect ratio of the video signal under the control of for example the control unit 18, and inverse-squeezes the designated video signal when judging that it was squeezed as a result of the judgment to convert the same to a video signal of the still image of the prescribed image size and outputs the same as the signal S15.

The converting unit 15 converts the video signal S13 of a moving picture reproduced by the moving picture recording and/or reproduction unit 13 to a video signal S15 of a still image of an image size in accordance with the aspect information SA of the video signal by the control signal CTL15 from the control unit 18 and outputs the same to the still image recording and/or reproduction unit 14.

At this time, the converting unit 15 inverse-squeezes the signal along the prescribed direction (for example, the horizontal direction) by interpolating the video signal compressed along the prescribed direction (for example the horizontal direction) for squeezing. The inverse-squeezing is not limited to the above format. For example, the converting unit 15 may inverse-squeeze the video signal compressed along the prescribed direction (for example the horizontal direction) for squeezing by thinning it out along a direction perpendicular to the prescribed direction. Further, the still image may be of any image size, so the converting unit 15 may enlarge or reduce it in the horizontal direction or vertical direction to convert it to give a ratio of size between the horizontal direction and the vertical direction of 16:9.

In the present embodiment, when a squeezed video signal of a moving picture of an aspect ratio of for example 16:9 is input, the converting unit 15 converts the same to a video signal S15 of a still image having an aspect ratio of 16:9 in vertical and lateral image sizes based on the aspect information SA corresponding to the video signal and outputs the same together with image size information SB indicating the image size to the still image recording and/or reproduction unit 14 under the control of the control unit 18. The still image recording and/or reproduction unit 14 records the video signal S15 of the still image and the image size information SB on the recording medium 101.

On the other hand, when a not squeezed (unsqueezed) video signal of a moving picture of an aspect ratio of for example 4:3 is input, based on the aspect information SA corresponding to the video signal, the converting unit 15 does not convert it, but outputs a video signal S15 of a still image having the aspect ratio of 4:3 to the still image recording and/or reproduction unit 14 together with the image size information SB indicating the image size under the control of the control unit 18. The still image recording and/or reproduction unit 14 records the video signal S15 of the still image and the image size information SB on the recording medium 101. Further, when an HD (high definition) video signal is input, the aspect ratio of the HD video signal is 16:9, therefore, the converting unit 15 does convert the aspect ratio, but outputs the HD signal as it is to the still image recording and/or reproduction unit 14. Note that the converting unit 15 may convert the size along the horizontal direction or vertical direction without conversion of the aspect ratio as explained above as well.

The video signal S14 of the still image reproduced by the still image recording and/or reproduction unit 14 can be displayed by for example the output system 17. For example, in the present embodiment, as will be explained later, provision is made of an output system 17 performing processing so as to display an image having a suitable aspect ratio based on the aspect information of the input video signal.

Further, when using the output system 17 explained above to display a video signal of a still image reproduced by the still image recording and/or reproduction unit 14, by providing the inverse-converting unit 16, a suitable video signal of the still image may be displayed without changing the output system 17.

For example, the inverse-converting unit 16 squeezes the signal in accordance with the video signal of the still image of the designated image size by the control signal CTL16 from the control unit 18 so as generates the video signal S16 of the still image and outputs the same linked with aspect information SA in accordance with the image size information SB.

The output system 17 performs processing such as display and output in response to the video signal. For example, the output system 17 has a display device with a display screen having a prescribed aspect ratio and displays images in accordance with the aspect ratio of the display screen and the aspect information SA of the input video signal.

For example, the output system 17 performs processing so that a displayed image having a suitable aspect ratio is obtained based on the aspect information of the input video signal as explained above.

In the present embodiment, the output system 17 has, as shown in FIG. 1, an aspect converting unit 171, a display panel 172, a finder 173, and an external output unit 174.

Specifically, the display panel 172, configured by a liquid crystal display (LCD) or organic electroluminescence (EL), or other display device, and the finder 173, such as an electronic view finder (EVF), display an image having the suitable aspect ratio in accordance with whether the display screen has the aspect ratio of 4:3 or 16:9.

For example, in the present embodiment, the aspect converting unit 171 adds a black image (black band) to for example the upper end and lower end or the left end and right end of the image according to need based on the aspect information of the input video signal by for example the control signal CTL171 from the control unit 18.

Further, the aspect converting unit 171, in addition to the conversion in the apparatus, may also output to a display device such as display panel 172 and finder 173 "wide" information indicating whether the normal mode is the full mode (squeezed) or letter box mode while leaving the image size the aspect ratio of 4:3 by the method of superimposing a DC value on a V (vertical direction) blanking section of the video signal or chroma (color) output of an S (still) video terminal so as to suitably display an image on the display device. The external output unit 174 adds the aspect information SA in accordance with the image size of the video signal of the still image, moving picture, etc. linked with the video signal for output. By doing this, another display device can display an image of the suitable aspect ratio without a distortion of an image in accordance with the video signal and aspect information SA output from the external output unit 174.

The control unit 18 centrally controls the components of the apparatus. For example, the control unit 18 controls the components in response to signals input from the mode setting unit 11 and the timing setting unit 12 and performs the processing according to the embodiment of the present invention.

Figure 2:
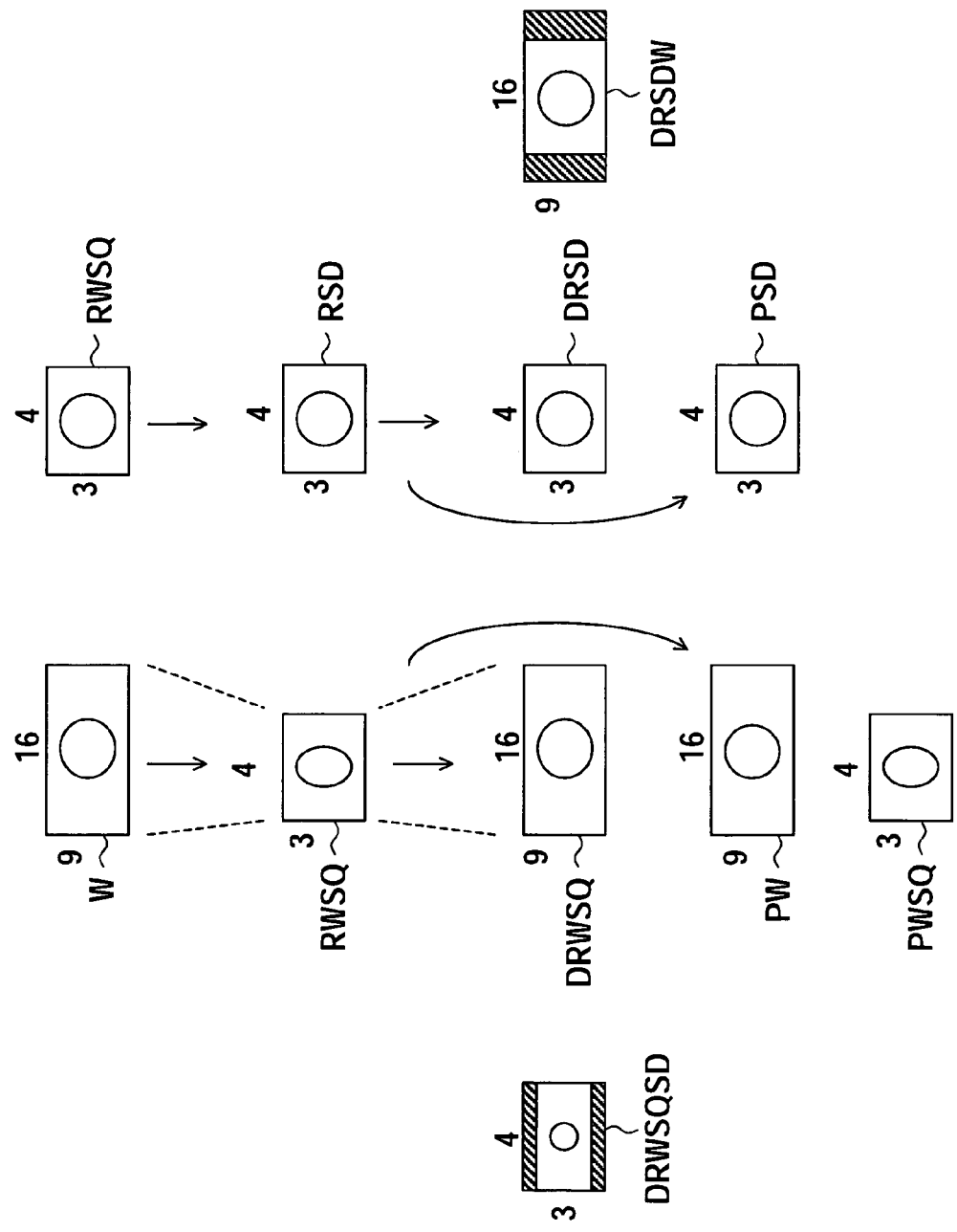
FIG. 2 is a diagram for explaining an operation of the video recorder shown in FIG. 1.
Figure 3:
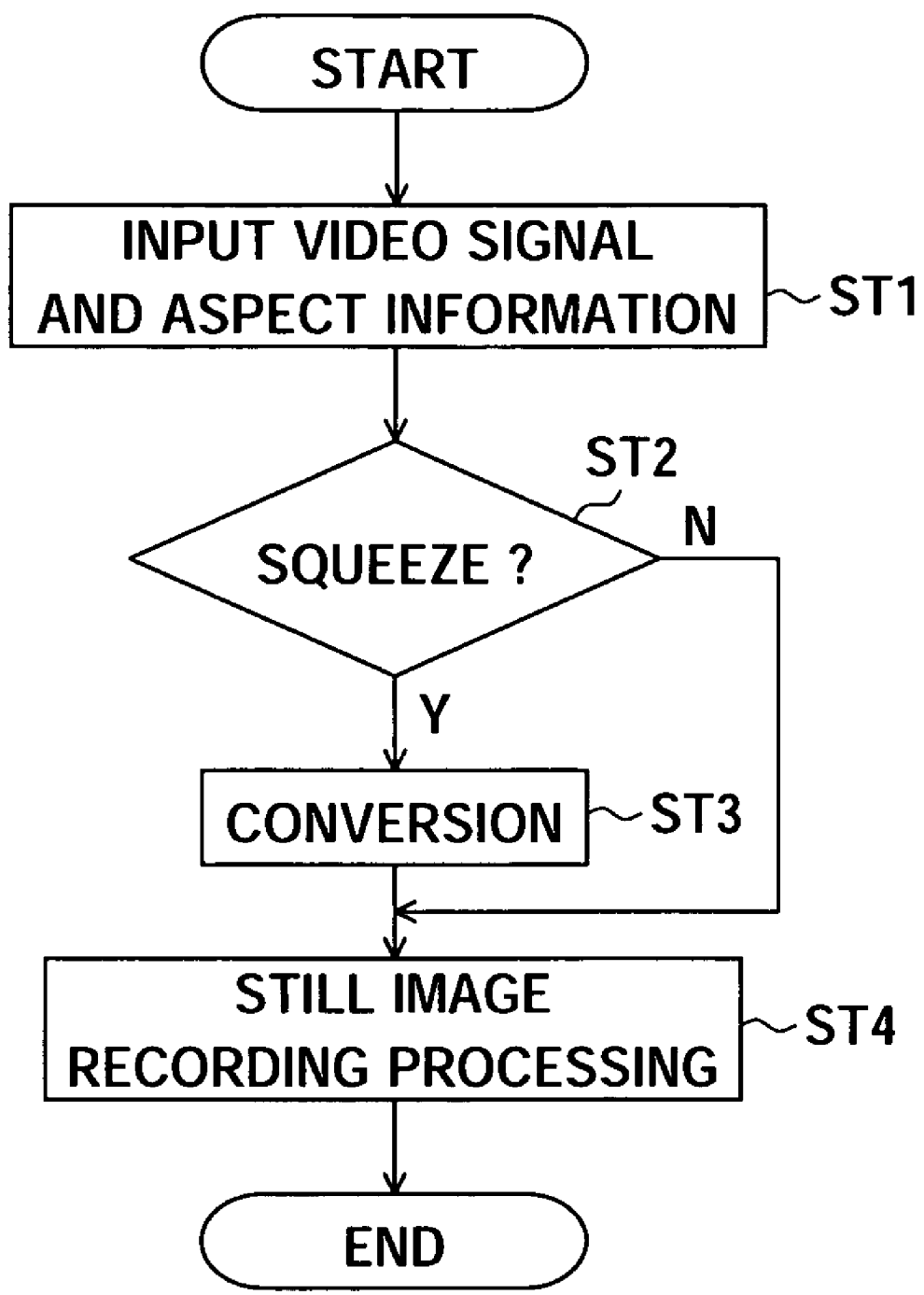
FIG. 3 is a flow chart for explaining a specific example of the operation of the video recorder shown in FIG. 1.

FIG. 2 is a diagram for explaining the operation of the video recorder shown in FIG. 1. FIG. 3 is a flow chart for explaining a specific example of the operation of the video recorder 1 shown in FIG. 1. Below, an explanation will be given of the operation of the video signal processing apparatus shown in FIG. 1 focusing on the operation of the control unit 18 by referring to FIGS. 2 and 3.

First Moving Picture Capturing Mode of Aspect Ratio of 4:3

When a signal S11 for setting a first moving picture capturing mode with an aspect ratio of 4:3 is input from the mode setting unit 11, the control unit 18 outputs a control signal CTL10 for setting the first image capturing mode to the image capturing unit 10. Further, the control unit 18 sets the terminal SW1a and the terminal SW1c of the selector SW1 to the conductive state and sets the terminal SW2b and the terminal SW2c of the selector SW2 to the conductive state.

The image capturing unit 10 receives the control signal CTL10 and outputs a video signal S10 (SD) having the aspect ratio of 4:3 and aspect information SA indicating the aspect ratio of 4:3 to the control unit 18 and the moving picture recording and/or reproduction unit 13 as shown in for example FIG. 2. The signal S10 is output to the output system 17 and the moving picture recording and/or reproduction unit 13 via the terminal SW1a and terminal SW1c and the terminal SW2b and terminal SW2c. The output system 17 performs the output in response to the signal S10.

When a signal indicating a recording start command is input from the timing setting unit 13, the control unit 18 outputs a control signal CTL13 indicating the recording start command to the moving picture recording and/or reproduction unit 13. The moving picture recording and/or reproduction unit 13 receives the control signal CTL13 and records a video signal S10 (RSD) on the recording medium 100 by the prescribed recording and/or reproduction scheme linked with the aspect information SA as shown in for example FIG. 2. Further, when a signal indicating a recording end command is input from the timing setting unit 12, the control unit 18 outputs a control signal CTL13 indicating the recording end command to the moving picture recording and/or reproduction unit 13. The moving picture recording and/or reproduction unit 13 suspends the recording upon receiving the control signal CTL13.

Second Moving Picture Capturing Mode of Aspect Ratio of 16:9

When a signal S11 for setting a second moving picture capturing mode with an aspect ratio of 16:9 is input from the mode setting unit 11, the control unit 18 outputs a control signal CTL10 for setting the second image capturing mode to the image capturing unit 10. Further, the control unit 18 sets the terminal SW1a and the terminal SW1c of the selector SW1 to the conductive state and sets the terminal SW2b and the terminal SW2c of the selector SW2 to the conductive state.

The image capturing unit 10 receives the control signal CTL10 and outputs a video signal S10 (W) having the aspect ratio of 16:9 and aspect information SA indicating the aspect ratio of 16:9 to the control unit 18 and the moving picture recording and/or reproduction unit 13 as shown in for example FIG. 2. The signal S10 is output to the output system 17 and the moving picture recording and/or reproduction unit 13 via the terminal SW1a and terminal SW1c and the terminal SW2b and terminal SW2c. The output system 17 performs the output in response to the signal S10.

When a signal indicating a recording start command is input from the timing setting unit 13, the control unit 18 outputs a control signal CTL13 indicating the recording start command to the moving picture recording and/or reproduction unit 13. The moving picture recording and/or reproduction unit 13 receives the control signal CTL13 and the aspect information SA, and as shown in for example FIG. 2, compresses (squeezes) the image along the prescribed direction, specifically the lateral direction (horizontal direction), and records a video signal S10 (RWSQ) of the moving picture (squeezed recording) having an image size of 4:3 on the recording medium 100 by the prescribed recording and/or reproduction scheme linked with the aspect information SA. Further, when a signal indicating a recording end command is input from the timing setting unit 12, the control unit 18 outputs a control signal CTL13 indicating the recording end command to the moving picture recording and/or reproduction unit 13. The moving picture recording and/or reproduction unit 13 suspends the recording upon receiving the control signal CTL13.

Edit Mode

When a signal S11 for setting the edit mode is input from the mode setting unit 11, the control unit 18 sets the terminal SW1b and the terminal SW1c of the selector SW1 to the conductive state, sets the terminal SW2b and the terminal SW2c of the selector SW2 to the conductive state, and sets the terminal SW3b and the terminal SW3c of the selector SW3 to the conductive state.

The control unit 18 outputs a control signal CTL13 indicating a reproduction command to the moving picture recording and/or reproduction unit 13. The moving picture recording and/or reproduction unit 13 reads the video signal recorded on the recording medium 100 and outputs the video signal S13 and the aspect information SA linked with the video signal S13. The video signal S13 is output to the output system 17 via the converting unit 15 and the terminal SW1b, terminal SW1c, terminal SW2b, and terminal SW2c.

For example, when a video signal S13 (RSD) having an aspect ratio of 4:3 is input, the output system 17 performs processing to display the display image DRSD having the aspect ratio of 4:3 as shown in FIG. 2 when the aspect ratio prescribed by the display panel 172 and the finder 173 is 4:3, while performs processing to display the display image DRSDW obtained by adding black band images to both the left end right ends as shown in for example FIG. 2 when the aspect ratio prescribed in the display panel 172 and the finder 173 is 16:9.

On the other hand, when a video signal S13 (RWSQ) having an aspect ratio of 16:9 is input, the output system 17 performs processing so that the displayed image has a suitable aspect ratio as shown in FIG. 2 when the aspect ratio prescribed in the display panel 172 and the finder 173 is 16:9 and displays the image DRWSQ, while performs processing to display the displayed image DRWSQSD obtained by adding black band images to both the upper end lower ends as shown in for example FIG. 2 when the aspect ratio prescribed in the display panel 172 and the finder 173 is 4:3.

When a signal S12 designating a still image of a desired timing in a video signal of a moving picture reproduced from the moving picture recording and/or reproduction unit 13 is input from the timing setting unit 12, the control unit 18 makes the still image recording and/or reproduction unit 14 record the indicated video signal. At this time, when for example the video signal S13 input from the moving picture recording and/or reproduction unit 13 and the aspect information SA indicating the aspect ratio of the video signal S13 are input (ST1), the converting unit 15 judges whether or not the video signal was squeezed S13 based on the video signal S13 and the aspect information SA (ST2), inverse-squeezes the designated video signal S13 when judging that it was squeezed as a result of the judgment to convert it to a video signal S15 of a still image of the prescribed image size, and outputs the same to the still image recording and/or reproduction unit 14 (ST3) under the control signal CTL15 from the control unit 18.

In more detail, when a video signal S13 (RSD) having an aspect ratio of 4:3 and aspect information SA indicating the aspect ratio of 4:3 are input, the converting unit 15 judges that the signal was not squeezed, does not unsqueeze it, and outputs the video signal S13 (RSW) as the signal S15 to the still image recording and/or reproduction unit 14 via the terminals SW3b and SW3c. The still image recording and/or reproduction unit 14 receives the video signal S15 and records the same as the video signal S15 (PSD) of the still image on the recording medium 101 linked with the image size information SB (ST4).

On the other hand, when a video signal S13 (RWSQ) having an aspect ratio of 16:9 and aspect information SA indicating the aspect ratio of 16:9 are input, the converting unit 15 judges that the signal was squeezed, inverse-squeezes the video signal S13 (RWSQ), specifically interpolates it in for example the horizontal direction, to convert it to a video signal S15 (PW) of a still image having the prescribed image size, and outputs the same to the still image recording and/or reproduction unit 14 via the terminals SW3b and SW3c. The still image recording and/or reproduction unit 14 receives the video signal S15 and records the same as the video signal S15 (PW) of the still image on the recording medium 101 linked with the image size information SB (ST4).

Still Image Display Mode

When a signal S11 for setting the still image display mode is input from the mode setting unit 11, the control unit 18 sets the terminal SW2a and terminal SW2c of the selector SW2 to the conductive state.

The control unit 18 outputs a control signal CTL14 indicating the reproduction signal to the still image recording and/or reproduction unit 14. The still image recording and/or reproduction unit 14 reads the video signal of the still image recorded on the recording medium 101 and outputs the video signal S14 and image size information SB linked with the video signal S14. The inverse-converting unit 16 squeezes or does not squeeze the signal in accordance with the video signal S14 of the still image based on the designated image size information SB, generates a video signal S16 of the still image, and outputs, the same to the output system 17 via the terminal SW2a and terminal SW2c by the control signal CTL16 from the control unit 18.

In more detail, for example, when a video signal S14 (PSD) of a still image having the aspect ratio of 4:3 is input, the inverse-converting unit 16 does not apply the inverse conversion (squeezing), and outputs the signal S14 (PSD) as it is to the output system 17 as the signal S16 linked with the aspect information SA in accordance with the image size information SB.

On the other hand, for example, when a video signal S14 (PW) of a still image having the aspect ratio of 16:9 is input, the inverse-converting unit 16 applies the inverse-conversion (squeezing) in accordance with the video signal S14 of the still image based on the designated image size information SB, in more detail thins out the signal along the prescribed direction (for example, the horizontal direction) to generate for example the video signal S16 (PWSQ) as shown in FIG. 2 and outputs the same to the output system 17 linked with the aspect information SA in accordance with the image size information SB by the control signal CTL16 from the control unit 18.

The output system 17 performs the display processing in accordance with the aspect ratio prescribed by the display device based on the signal S16 and the aspect information SA of the input still image under the control of the control unit 18.

Still Image Capturing Mode

When a signal S11 for setting a still image capturing mode having the aspect ratio of 4:3 or 16:9 is input from the mode setting unit 11, the control unit 18 outputs a control signal CTL10 for setting the still image capturing mode to the image capturing unit 10. Further, the control unit 18 sets the terminal SW3a and the terminal SW3c of the selector SW3 to the conductive state.

The image capturing unit 10 receives the control signal CTL10 and outputs a video signal S10 of a still image having the aspect ratio of 4:3 or the aspect ratio of 16:9 and the aspect information SA to the control unit 18 and the still image recording and/or reproduction unit 14. The signal S10 is output to the still image recording and/or reproduction unit 14 via the terminal SW3a and the terminal SW3c. The still image recording and/or reproduction unit 14 records the video signal S10 of the still image on the recording medium 101 by the prescribed recording and/or reproduction scheme linked with the image size in accordance with the aspect information SA by the control signal CTL14 by the control unit 18.

As explained above, the video recorder 1 according to the present embodiment is provided with the converting unit 15 configured to judge whether or not the video signal was squeezed based on the input video signal and the aspect information SA indicating the aspect ratio of the video signal and inverse-squeeze the designated video signal when judging that it was squeezed as a result of the judgment to convert it to a video signal of a still image of the prescribed image size and is provided with the still image recording and/or reproduction unit 14 configured to record the video signal of the still image converted by the converting unit 15, therefore can obtain a suitable still image from a squeezed video signal.

That is, by recording a still image with an image size of the aspect ratio of the aspect information SA of the video signal of the moving picture at the time of capturing a still image, it is possible to record a video signal of a still image having a correct aspect ratio on the recording medium 101.

Also, the converting unit 15 inverse-squeezes a video signal compressed along as prescribed direction for squeezing by interpolating it along the prescribed direction, so the present invention can be achieved by simple processing. Further, the processing load is small.

Further, since provision is made of the output system 17 for performing processing so as to obtain a displayed image having a suitable aspect ratio based on the aspect information of the input video signal and of the inverse-converting unit 16 configured to squeeze the signal in accordance with the video signal of the still image having the designated image size output from the still image recording and/or reproduction unit 14 and output the same linked with aspect information in accordance with the image size and since for example the display panel 172 and the finder 173 of the output system 17 perform processing in accordance with the video signal S16 and aspect information SA output from the inverse converting unit 16, it is possible to use a common output system 17 at the time of the reproduction of the still image and at the time of the reproduction of the moving picture and therefore possible to simplify the circuit configuration in comparison with the case of separately providing a display processing circuit for reproducing a still image.

Further, since provision is made of the moving picture recording and/or reproduction unit 13 configured to record video signals having first and second aspect ratios as video signals of moving pictures having prescribed image sizes linked with aspect information indicating the aspect ratios and reproduce the recorded video signals and aspect information, the still image recording and/or reproduction unit 14 configured to record video signals of still images having image sizes in accordance with the first and second aspect ratios linked with image size information indicating the image sizes and reproduce the recorded video signals and image size information, and the converting unit 15 configured to convert the video signals of moving pictures reproduced by the moving picture recording and/or reproduction unit 13 to video signals of still images having image sizes in accordance with the aspect information of the video signals and outputting the same to the still image recording and/or reproduction unit 14, it is possible to obtain suitable still images with a simple circuit configuration.

Second Embodiment

Figure 4:
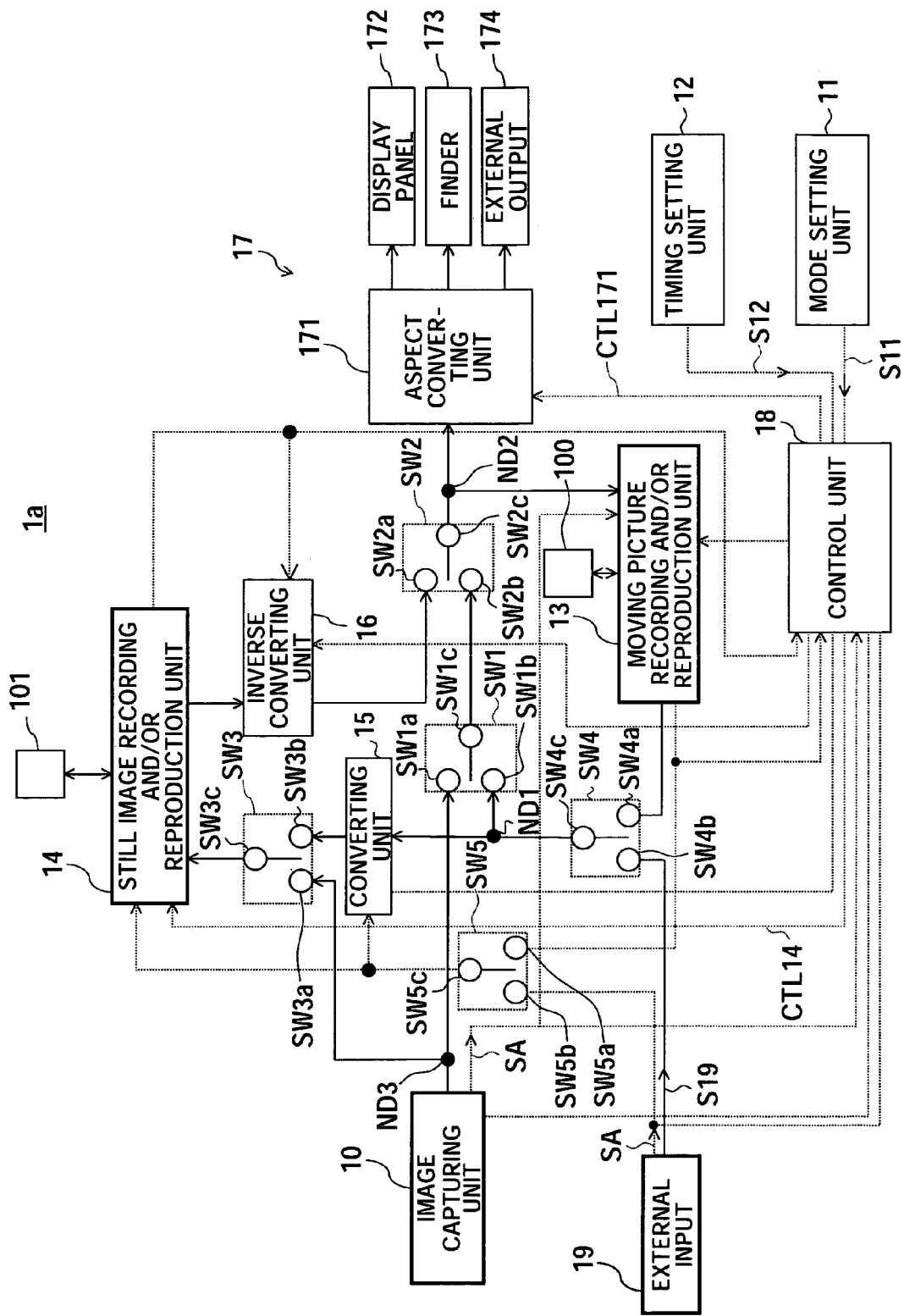
FIG. 4 is a functional block diagram of a video recorder using a video signal processing apparatus according to a second embodiment of the present invention.

FIG. 4 is a functional block diagram of a video recorder using a video signal processing apparatus according to a second embodiment of the present invention. A video recorder 1a according to the present embodiment has, for example as shown in FIG. 4, an image capturing (taking or obtaining) unit 10, mode setting unit 11, timing setting unit 12, moving picture recording and/or reproduction unit 13, still image recording and/or reproduction unit 14, converting unit 15, inverse-converting unit 16, output system 17, control unit 18, external input unit 19, and selectors SW1 to SW5. The difference of the video recorder 1a according to the present embodiment in comparison with for example the first embodiment resides in the point that the external input unit 19 and selectors SW4 and SW5 are provided. An explanation will be given focusing on the difference from the first embodiment. Explanation of the same components and operation as those of the first embodiment will be omitted.

The external input unit 19 outputs a video signal S19 of a moving picture, for example, an analog signal or digital signal or a compressed or uncompressed video signal, and aspect information SA indicating the aspect ratio of the video signal S19.

The selector SW4 has a terminal SW4a, a terminal SW4b, and a terminal SW4c, while the selector SW5 has a terminal SW5a, a terminal SW5b, and a terminal SW5c.

The terminal SW4a is connected to the moving picture recording and/or reproduction unit 13, the terminal SW4b is connected to the video signal output of the external input unit 19, and the terminal SW4c is connected to the converting unit 15 and the terminal SW1b via the node ND1. The terminal SW5a is connected to the moving picture recording and/or reproduction unit 13 and the control unit 18, the terminal SW5b is connected to the aspect information output of the external input unit 19, and the terminal SW5c is connected to the still image recording and/or reproduction unit 14.

External Input Mode

For example, at the time of the initialization other than the external input mode, the control unit 18 sets the terminal SW4a and terminal SW4c of the selector SW4 to the conductive state and sets the terminal SW5a and terminal SW5c of the selector SW5 to the conductive state. When a signal S11 for setting the external input mode is input from the mode setting unit 11, the control unit 18 sets the terminal SW4b and terminal SW4c of the selector SW4 to the conductive state and sets the terminal SW5b and terminal SW5c of the selector SW5 to the conductive state.

The external input unit 19 outputs the video signal S19 to the converting unit 15 via the terminals SW4b and SW4c. Further, the external input unit 19 outputs the aspect information SA to the converting unit 15 and the still image recording and/or reproduction unit 14 via the control unit 18 and terminals SW5 and SW5c.

The processings of the control unit 18, converting unit 15, and still image recording and/or reproduction unit 14 are the same as those of the first embodiment, so detailed explanations will be omitted.

As explained above, by providing a simple circuit configuration, in more detail further providing the external input unit 19 and the selectors SW4 and SW5 in the video recorder 1 according to the first embodiment, it is possible to convert the video signal S19 and the aspect information SA from the external input unit 19 by processing according to the present invention to record a video signal of the desired still image on the recording medium 101 by the still image recording and/or reproduction unit 14.

Note that the present invention is not limited to the above embodiments. Any preferred modifications may be made. For example, the moving picture recording and/or reproduction unit 13 may also record data on a recording medium 100 having a relatively large capacity such as a tape or disk, while the still image recording and/or reproduction unit 14 may use a recording medium 101 having a relatively small capacity in comparison with the recording medium 100 such as a rewritable semiconductor memory. The present invention is not limited to any particular format.

Further, two recording media of the recording medium 100 and the recording medium 101 were used in the embodiments, but the present invention is not limited to this. For example, it is also possible to record the video signals of the moving picture and the still image on the same recording medium.

Further, in the present embodiment, the moving picture recording and/or reproduction unit 13 and the still image recording and/or reproduction unit 14 recorded the video signals on recording media, but the present invention is not limited to the above. For example, it is also possible if the moving picture recording and/or reproduction unit 13 and the still image recording and/or reproduction unit 14 record video signals in an external recording apparatus other than the present apparatus and reproduce the same by a wire method or wireless method.

Summarizing the effects of the invention, it is possible to apply the present invention to a video signal processing apparatus for processing video signals having for example a plurality of different aspect ratios.

It should be understood by those skilled in the art that various modifications, combinations, sub-combinations, and alterations may occur depending on design requirements and other factors insofar as they are within the scope of the appended claims or the equivalents thereof.

What we claim is:

1. A video signal processing apparatus comprising:
   a specifying means for specifying a desired timing for recording a still image from an input video signal of a moving picture stored in a moving picture recording unit;
   a recording means for starting and ending recording of the still image from the input video signal of the moving picture according to the desired timing;
   a converting means for judging, upon finishing capturing of the still image from the input video signal of the moving picture based on the desired timing and prior to recording the still image, whether or not the still image from the input video signal of the moving picture has been squeezed based on the input video signal of the moving picture, and aspect information indicating an aspect ratio of the input video signal of the moving picture, and inverse-squeezing the still image upon determining that the input video signal of the moving picture was squeezed; and
   a reproduction means for recording the inverse-squeezed still image along with still image size information on a recording medium.

2. A video signal processing apparatus as set forth in claim 1, wherein the converting means inverse-squeezes the squeezed input video signal by interpolating the input video signal along a prescribed direction.

3. A video signal processing apparatus as set forth in claim 1, further comprising a displaying means for displaying an image of a suitable aspect ratio based on the aspect ratio of the input video signal.

4. A video signal processing apparatus as set forth in claim 3, further comprising an inverse-converting means for squeezing the still image based on the still image size information and outputting the result linked with aspect information, the displaying means displaying the still image in accordance with the aspect information output by the inverse-converting means.

5. A video signal processing apparatus as set forth in claim 1, further comprising a recording and/or reproducing means for squeezing or not squeezing the input video signal in accordance with aspect information of the input video signal and recording it linked with the aspect information and outputting the recorded video signal and aspect information, the converting means performing processing in accordance with the input video signal and aspect information from the recording and/or reproducing means.

6. A video signal processing apparatus comprising:
   a first recording and/or reproducing means for recording video signals having first and second aspect ratios as video signals of moving pictures having prescribed image sizes linked with aspect information indicating the aspect ratios and reproducing the recorded video signals and aspect information;

a second recording and/or reproducing means for recording video signals of still images having image sizes in accordance with the first and second aspect ratios linked with image size information indicating the image sizes and reproducing the recorded video signals and image size information;

a specifying means for specifying a desired timing for recording a still image from the recorded video signals of moving pictures; and a converting means for converting video signals of moving pictures reproduced by the first recording and/or reproducing means to video signals of still images having image sizes in accordance with the aspect information of the video signals and outputting the same to the second recording and/or reproducing means.

7. A video signal processing method including:

specifying a desired timing for recording a still image from an input video signal of a moving picture;

starting and ending recording of the still image from the input video signal of the moving picture according to the desired timing;

judging, upon finishing capturing of the still image from the input video signal of the moving picture based on the desired timing and prior to recording the still image, whether or not the still image recorded from the input video signal of the moving picture has been squeezed based on an input video signal of the moving picture and aspect information indicating an aspect ratio of the video signal of the moving picture;

inverse-squeezing the still image upon determining that the input video signal of the moving picture was squeezed; and recording the inverse-squeezed still image along with still image size information on a recording medium.

8. A video signal processing method able to process a video signal of a first aspect ratio and a video signal of a second aspect ratio, including:

a first recording and/or reproducing step of recording video signals as video signals of moving pictures having prescribed image sizes linked with aspect information indicating the first and second aspect ratios and reproducing the recorded video signals and the aspect information;

a converting step of converting video signals of moving pictures reproduced in the first recording and/or reproducing step to video signals of still images having image sizes in accordance with the aspect information of the video signals;

a specifying step of specifying a desired timing for recording a still image from the recorded video signals of moving pictures; and a second recording and/or reproducing step of recording video signals of still images converted at said converting step linked with image size information indicating the image sizes and reproducing the recorded video signals and image size information.

9. A video signal processing apparatus comprising:

a specifying unit configured to specify a desired timing for recording a still image from an input video signal of a moving picture;

a recording unit configured to start and end recording of the still image from the input video signal of the moving picture according to the desired timing;

a converting unit configured to judge, upon finishing capturing of the still image from the input video signal of the moving picture based on the desired timing and prior to recording the still image, whether or not the still image has been squeezed based on the input video signal of the moving picture and aspect information indicating an aspect ratio of the video signal of the moving picture, and to inverse-squeeze the still image upon determining that the input video signal of the moving picture was squeezed; and a reproduction unit configured to record the inverse-squeezed still image along with still image size information on a recording medium.

10. A video signal processing apparatus comprising:

a first recording and/or reproducing unit configured to record video signals having first and second aspect ratios as video signals of moving pictures having prescribed image sizes linked with aspect information indicating the first and second aspect ratios and to reproduce the recorded video signals and the aspect information;

a second recording and/or reproducing unit configured to record video signals of still images having image sizes in accordance with the first and second aspect ratios linked with image size information indicating the image sizes and to reproduce the recorded video signals and the image size information;

a specifying unit for specifying a desired timing for recording a still image from the recorded video signals of moving pictures; and a converting unit configured to convert video signals of moving pictures reproduced by the first recording and/or reproducing unit to video signals of still images having image sizes in accordance with the aspect information of the video signals and to output the same to the second recording and/or reproducing unit.

* * * * *